UNITED STATES PATENT OFFICE.

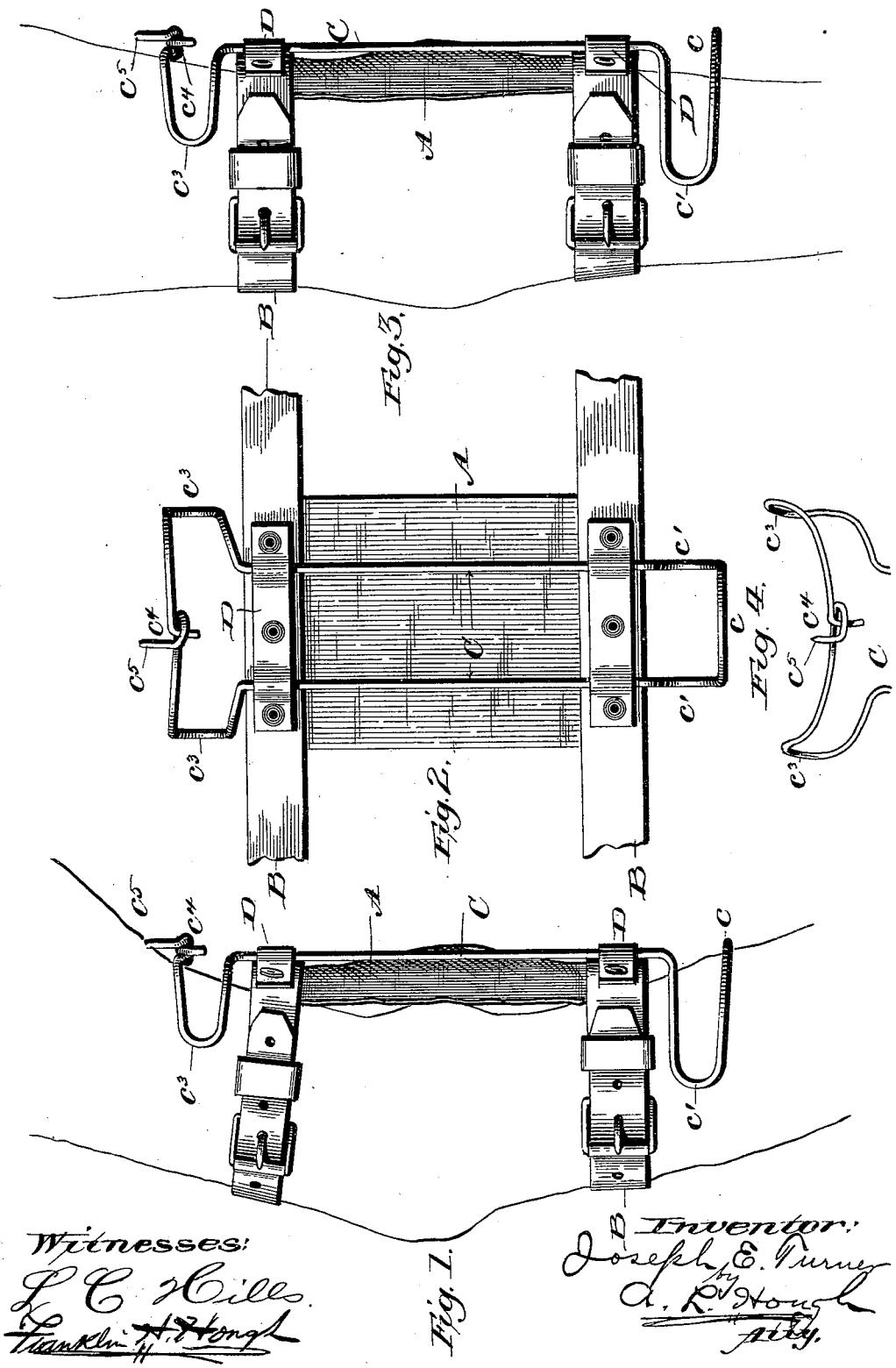

JOSEPH EVERETT TURNER, OF BURGIN, KENTUCKY, ASSIGNOR OF ONE-HALF TO GEORGE M. McCABE, OF SAME PLACE.

KICKING-HOPPLE.

SPECIFICATION forming part of Letters Patent No. 544,241, dated August 6, 1895.

Application filed November 30, 1894. Serial No. 530,432. (No model.)

*To all whom it may concern:*

Be it known that I, JOSEPH EVERETT TURNER, a citizen of the United States, residing at Burgin, in the county of Mercer and State of Kentucky, have invented certain new and useful Improvements in Kicking-Hopples; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in hopples; and it has for its object to provide a device by the use of which horses or other animals may be restrained from jumping, from running fast, and the like.

The invention has for a further object the production of a hopple which will be thoroughly effective in use without causing annoyance or inconvenience to the animal when the animal is quiet; and, finally, I provide an invention which will be simple in construction, durable, and which will not tend to lame or damage the animal wearing it.

To these ends and to such others as the invention may pertain the same consists, further, in the novel construction, combination, and adaptation of the parts, as will be hereinafter more fully described, and then specifically defined in the appended claims.

Figure 1 is a view showing my device attached to the fore leg of a horse, the leg being shown as bent, and in the same position assumed by it when the animal is in the act of jumping. Fig. 2 is a face view of the device. Fig. 3 is a view showing the device attached to the fore leg of a horse, the leg being straight; and Fig. 4 is a detail of the upper end of the wire frame.

Reference now being had to the details of the drawings by letter, A designates a piece of webbing, which has secured at either end the leather straps B, one of the ends of each strap being provided with a buckle and the opposite end being provided with eyes or perforations in which the tongues of the buckle may be secured.

C designates a wire which is bent upon itself at its middle so as to form the rearwardly-curved loop $c$ and the forwardly-disposed wings $c'$ on either side of the said loop. The ends of the wire extend upward beyond the loops $c'$ in lines parallel to each other and are forwardly and rearwardly curved into loops $c^3$, the ends of the wires interlocking at $c^4$, and one terminal extended beyond the interlocking point to form a spur $c^5$. The interlocking of the two terminals is secured by means of one being bent to form the eye into which the other may slide. By this means and the curvature given the loop $c^3$ an upward pressure upon the lower end causes the upper end to be squeezed together and thus pinch the leg of the animal. The wire structure thus formed is secured to the straps B by means of the straps D. The wire structure is arranged upon the side of the webbing, so that the webbing will come between it and the leg of the horse.

In using the hopple it is secured to the horse with the wire C at the rear of the fore knee of a horse by fastening one of the straps B above the knee-joint and the other strap below the knee-joint, the webbing A being next to the horse and the spur $c^5$ of the wire, when in its normal position is held away from immediate contact with the horse by means of the straps B and the webbing A. The wire C is loosely held by the straps D, so that the said wire may be moved slightly upwardly or downwardly. When the horse or other animal is standing still or moving slowly, he will not be inconvenienced by the wire C, but whenever the horse attempts to move rapidly or to jump he will bend his fore knee to such an extent that the lower part of the fore leg will press upon the inwardly-curved loop $c$ and drive the abruptly-hooked points $c^4$ in the back part of the leg above the knee, and the knee will be prevented from bending further by the resistance of the stiff wire, the loops $c^3$ of which will pinch the leg.

It will be seen from the foregoing description that while my improved hopple will be thoroughly efficient in use and unnoticeable it will be comfortable to the horse and in no way painful or cruel, as the end of the wire is blunt and merely serves to correct the horse by giving it a slight prod whenever it attempts to jump, and the device can be worn when the leg is bent in the ordinary manner without in any way interfering with the horse's leg. It is generally desirable to use one hopple at the back of each of the fore knees, thus preventing any possibility of a horse jumping or running fast.

Having thus described my invention, what I claim to be new, and desire to secure by Letters Patent, is—

1. The herein described hopple, the same consisting of the oblong wire frame, the ends of which are inwardly bent and at each corner forwardly extended and adapted to embrace the foreleg of the animal above and below the knee, one of the said ends being provided with a prod, and the attaching straps secured to the frame near the ends thereof, substantially as specified.

2. The hopple, the webbing A, the straps B secured to the webbing at the ends thereof, the oblong wire frame C, said frame consisting of the wire blank bent at its center to form the rearwardly disposed bend $c$ at each side of the same, laterally bent to form the loops $c'$, beyond the loops upwardly disposed, and near their upper ends laterally disposed to form the loops $c^3$, slidably coupled as at $c^4$, one end of the wire being extended to form the spur $c^5$ and the short keepers D secured to the straps B and loosely connecting the wire frame, substantially as shown and described.

3. The herein described hopple, the same consisting of the oblong elastic section, the straps secured to the ends thereof and provided with keepers and the oblong wire frame held by the keepers the opposite ends of which are bent to embrace the foreleg of a horse above and below and in rear of the knee joint thereof, one of the said ends being provided with a prod, substantially as and for the purpose set forth.

In testimony whereof I affix my signature in presence of two witnesses.

JOSEPH EVERETT TURNER.

Witnesses:
H. P. JOHNSON,
GEO. M. McCABE.